Oct. 29, 1957   D. S. MITCHELL ET AL   2,810,926
AUTOMATIC HEAD DROPPER FOR POULTRY
Filed July 21, 1954
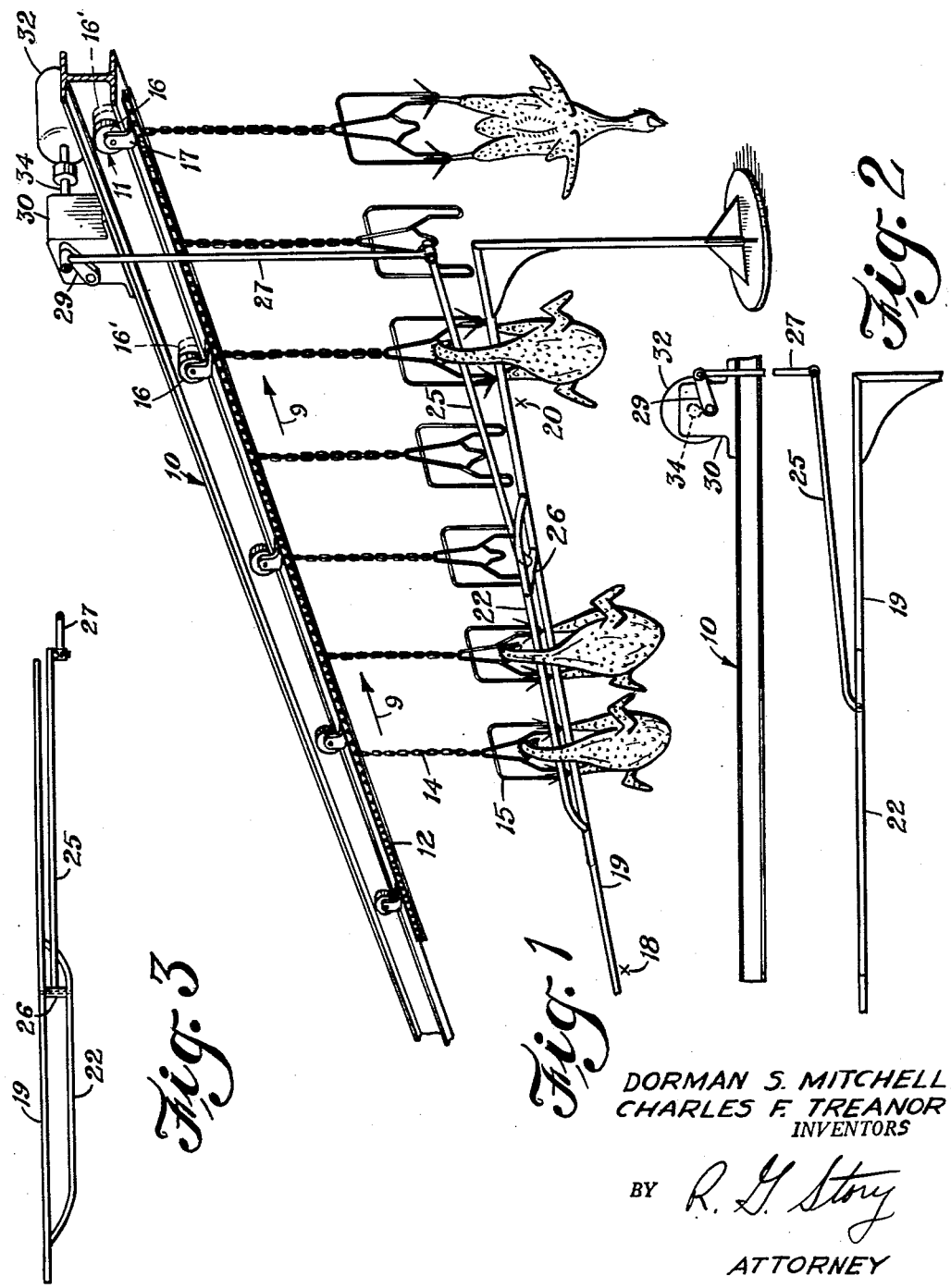
DORMAN S. MITCHELL
CHARLES F. TREANOR
INVENTORS
BY R. G. Story
ATTORNEY

United States Patent Office 2,810,926
Patented Oct. 29, 1957

2,810,926

AUTOMATIC HEAD DROPPER FOR POULTRY

Dorman S. Mitchell and Charles F. Treanor, Harrisonburg, Va., assignors to Swift & Company, Chicago, Ill., a corporation of Illinois Application July 21, 1954, Serial No. 444,722

4 Claims. (Cl. 17—11)

This invention pertains to an apparatus for the dropping of the heads of poultry which are suspended from shackles by their legs and heads.

In the large scale dressing of poultry, the birds are passed through a defeathering machine or machines and frequently in the operation of these machines, in order to assure the effective removal of feathers from certain areas of the fowl, it is necessary to limit the freedom of movement of the shackled fowl within the machine. To accomplish this it is the conventional practice to shackle the bird around a horizontally-disposed guide bar which extends through the defeathering machine along the line of movement of the processing line. In so shackling the bird, it is looped around the guide bar and suspended from the shackle by its head and legs. It has been necessary in the past for the operator to stand at a point beyond the defeathering machine to drop the head from the head holder of the shackle, thus placing the shackled bird in the proper position for further processing.

It is the object of the present invention to provide a device for automatically dropping the head of the fowl and thus releasing the last-mentioned operator to other duties.

The foregoing and other objects will more clearly appear from the following detailed description of a presently preferred embodiment of the invention when considered in connection with the accompanying drawing in which Figure 1 is an isometric view of the essential elements making up our head dropper;

Figure 2 is a schematic side view on a reduced scale of the apparatus of our invention; and Figure 3 is a schematic plan view of the apparatus of Figure 2.

The defeathering machine which in plant operation would appear at the central portion of Figure 1 has been purposely omitted in order to more clearly illustrate the apparatus of our invention. The defeathering machine might be one such as illustrated and described in U. S. Patents Nos. 2,512,843 or 2,560,524.

The overhead conveyer 10 illustrated may be of any of the conventional type used in poultry processing plants. The one illustrated in Figure 1 is made up of an overhead, horizontally disposed I-beam and spaced individual trolleys 11 which run along the I-beam and together support a heavy horizontally disposed link chain 12 which in turn carries at spaced intervals the shackle assemblies each made up of a vertical chain 14 and a shackle proper 15.

The trolleys each have a pair of wheels 16 and 16' the individual wheels of which ride on the upper surface of the lower flange of the I-beam. The trolley wheels, which are spaced on opposite sides of the beam, are movably locked together and to the I-beam by a U-shaped strap 17. The U strap has movably mounted to the inside of each of its legs one of the wheels and passes under the lower side of the I-beam to join the wheels together.

At the point 18 preceding the defeathering machine, a workman stands abreast a head-high horizontally disposed guide bar 19, and with the approach of each shackled bird (which at this point is suspended by its legs with the head down) reaches beyond and beneath the guide bar to grab the head of the shackled bird. He draws the head of the bird to him, beneath the bar, and in the same movement raises the head upward on his side of the guide bar and slips it into the head holder of the shackle, thereby shackling the bird around the guide bar. The bird when suspended by its legs and head from the shackle forms a loop with the shackle, through which loop the guide bar extends. By so shackling the bird around the guide bar, its freedom of movement under the beating action of picking fingers of the defeathering machine is thereby limited, thus assuring more complete feather removal.

The conveyor moves the bird in the direction indicated by the arrows 9 through the defeathering machine (not illustrated) to a point 20. In conventional operation a workman standing at point 20 would lift and drop the head from the holder leaving the bird shackled solely by its legs. The defeathering machine in plant operation would be generally in the area where the guide bar has a paralleling side rail 22. The purpose of the paralleling side rail is to cooperate with the guide bar to spread the looped bird, thereby further reducing the tendency of the bird to move under the beating of the picking fingers.

In the illustrated head dropping device of our invention we pivotally support an elongated rocker arm 25 by a short cross piece 26 between the guide bar and its paralleling side rail. The rocker arm is affixed to the cross piece which is movably mounted at its respective ends to the guide bar and the side rail. The rocker arm extends from the point of pivot in the direction of the movement of the shackled fowl and in a plane paralleling the guide rail. It will be noted that the pivot of the rocker arm is at such an elevation as to thread the rocker arm through the loops formed by the moving fowl and their shackles. Figure 2 clearly shows that a sufficiently large upward movement of the rocker arm will free the head of the fowl from the shackle. Various means may be employed for raising and lowering the rocker arm. For that matter, a workman could do the job. In the device illustrated, the non-pivoted end of the rocker arm is movably coupled to an upright drive rod 27 which is driven by a short crank 29 through a gear box 30. The gear box in turn is coupled to an electric motor 32 by a drive shaft 34.

In one presently operating installation of our invention we employ a 5-foot rocker arm which is driven at a frequency of 40 cycles per minute. With the conveyer line moving at a speed of 36 to 40 birds per minute, the rocker arm usually drops one head with each oscillation.

Obviously, many modifications and variations of the invention as hereinbefore set forth may be made without departing from the spirit and scope thereof, and therefore only such limitations should be imposed as are indicated in the appended claims.

We claim:

1. A fowl suspending and conveying device comprising a shackle having fowl leg and head engaging portions, a substantially horizontally movable support connected to said shackle, a guide rail adjacent said shackle, and substantially parallel to said support, an arm pivotally connected to said rail about a substantially horizonal axis, and vertically reciprocating means connected to said arm at a point remote from said pivotal connection, whereby when a fowl, loopedly suspended from said shackle by its head and feet about said rail and arm, is moved therealong and the end of said arm remote from said pivot is moved vertically, the fowl's head will be removed from the shackle.

2. A device for use with a fowl suspending and conveying apparatus having fowl leg extremity and head and neck extremity engaging portions and a guide rail about which the fowl are looped with the extremities on opposite sides of said rail, said device comprising movable means associated with said rail and movable vertically with respect to said rail, and power means connected to said movable means to raise and lower said movable means to disengage one of said extremities from said apparatus.

3. A device for use with a fowl suspending and conveying apparatus having fowl leg extremity and head and neck extremity engaging portions and a guide rail about which the fowl are looped with the extremities on opposite sides of said rail for movement in a given direction, said device comprising an elongated rocker arm pivotally connected to said guide rail and extending from the point of connection in the direction of movement of the fowl, and means connected to said rocker arm at a point spaced along said rocker arm from said pivotal connection to raise and lower said rocker arm to disengage one of said extremities from said apparatus.

4. A device for use with a fowl suspending and conveying apparatus including a shackle having a fowl leg extremity engaging portion and a generally V-shaped head and neck extremity engaging portion and a guide rail about which the fowl are looped with the extremities on opposite sides of said rail for movement in a given direction, said device comprising an elongated rocker arm pivotally connected to said guide rail and extending from the point of connection in the direction of movement of the fowl, and power means connected to said rocker arm at a point spaced along said rocker arm from said pivotal connection to raise and lower said rocker arm to disengage said head and neck extremity from said V-shaped engaging portion.

References Cited in the file of this patent

UNITED STATES PATENTS

| | | |
|---|---|---|
| 2,412,338 | Jasper | Dec. 10, 1946 |
| 2,557,707 | Utter | June 19, 1951 |
| 2,667,660 | Lentz et al. | Feb. 2, 1954 |
| 2,714,223 | Lentz et al. | Aug. 2, 1955 |